United States Patent
Zhou (10) Patent No.: US 10,417,479 B2
(45) Date of Patent: Sep. 17, 2019

(54) METHOD FOR CONTROLLING UNLOCKING AND TERMINAL

(71) Applicant: Guangdong Oppo Mobile Telecommunications Corp., Ltd., Dongguan, Guangdong (CN)

(72) Inventor: Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/589,250

(22) Filed: May 8, 2017

(65) Prior Publication Data

US 2017/0344795 A1    Nov. 30, 2017

(30) Foreign Application Priority Data

May 30, 2016  (CN) .......................... 2016 1 0375423

(51) Int. Cl.
G06K 9/00      (2006.01)
G06F 21/32     (2013.01)
G06K 9/03      (2006.01)

(52) U.S. Cl.
CPC ......... *G06K 9/00087* (2013.01); *G06F 21/32* (2013.01); *G06K 9/0002* (2013.01); *G06K 9/036* (2013.01)

(58) Field of Classification Search
USPC .............. 1/1; 324/658; 340/5.53, 5.82, 5.83; 345/174; 348/77; 382/125, 126;
(Continued)

(56) References Cited

U.S. PATENT DOCUMENTS 6,970,584 B2 * 11/2005 O'Gorman ........... A61B 5/1172
                                                340/5.83
6,990,219 B2 *  1/2006 Morimura .......... G06K 9/00013
                                                340/5.53
(Continued)

FOREIGN PATENT DOCUMENTS

CN      101165706 A    4/2008
CN      105159585 A   12/2015
(Continued)

OTHER PUBLICATIONS

International Search Report issued in corresponding international application No. PCT/CN2017/082275 dated Jul. 5, 2017.

*Primary Examiner* — Xuemei G Chen
(74) *Attorney, Agent, or Firm* — Young Basile Hanlon & MacFarlane, P.C.

(57) ABSTRACT

A method for controlling unlocking includes the follows. When a touch operation of a finger of a user on a fingerprint recognition sensor of a terminal is detected, N first fingerprint images are received according to N capacity auto control (CAC) parameters corresponding to a default finger, and M second fingerprint images are received according to M CAC parameters corresponding to fingerprint stabilization, wherein N is a positive integer, and M is an integer greater than 1; the best fingerprint image of the N first fingerprint images and the M second fingerprint images is selected; the selected fingerprint image is compared; the terminal is unlocked when the selected fingerprint image is matched.

18 Claims, 8 Drawing Sheets

(58) Field of Classification Search
USPC .......................................................... 715/833
See application file for complete search history.

(56) References Cited

U.S. PATENT DOCUMENTS

| | | | | |
|---|---|---|---|---|
| 7,050,609 | B2* | 5/2006 | Huang | G06K 9/00087 |
| | | | | 340/5.82 |
| 8,779,780 | B1* | 7/2014 | Peterson | G06F 3/0418 |
| | | | | 324/658 |
| 8,982,097 | B1* | 3/2015 | Kuzo | G06F 3/0418 |
| | | | | 345/174 |
| 9,154,697 | B2 | 10/2015 | Geiss et al. | |
| 9,390,306 | B2* | 7/2016 | Minteer | G06K 9/00013 |
| 9,648,181 | B2* | 5/2017 | Fujimoto | G06F 3/0416 |
| 9,922,228 | B2* | 3/2018 | Jiang | G06F 3/04886 |
| 2007/0290124 | A1 | 12/2007 | Neil et al. | |
| 2008/0267465 | A1* | 10/2008 | Matsuo | A63F 13/10 |
| | | | | 382/126 |
| 2011/0032074 | A1 | 2/2011 | Novack et al. | |
| 2012/0060123 | A1* | 3/2012 | Smith | G06F 3/04883 |
| | | | | 715/833 |
| 2013/0265451 | A1 | 10/2013 | Son et al. | |
| 2014/0267659 | A1* | 9/2014 | Lyon | G06K 9/0002 |
| | | | | 348/77 |
| 2015/0310250 | A1* | 10/2015 | Fenrich | G06K 9/00026 |
| | | | | 382/125 |
| 2016/0078274 | A1 | 3/2016 | Tuneld et al. | |
| 2016/0314338 | A1* | 10/2016 | Li | G06K 9/00 |
| 2016/0328600 | A1* | 11/2016 | Che | G06T 7/11 |
| 2017/0032546 | A1 | 2/2017 | Westerhoff et al. | |
| 2017/0091521 | A1* | 3/2017 | Tieu | G06K 9/00067 |
| 2017/0329463 | A1* | 11/2017 | Kurisu | G06F 3/0482 |
| 2017/0371608 | A1* | 12/2017 | Wasserman | G06F 3/14 |
| 2018/0032792 | A1* | 2/2018 | Wang | G06K 9/00087 |

FOREIGN PATENT DOCUMENTS

| | | |
|---|---|---|
| CN | 105589643 A | 5/2016 |
| CN | 106022067 A | 10/2016 |
| CN | 106022068 A | 10/2016 |
| CN | 106055955 A | 10/2016 |
| CN | 106096372 A | 11/2016 |
| JP | 2000020719 A | 1/2000 |
| WO | 9926187 A1 | 5/1999 |

* cited by examiner

METHOD FOR CONTROLLING UNLOCKING AND TERMINAL

CROSS-REFERENCE TO RELATED APPLICATION(S)

This application claims priority to Chinese Patent Application No. 201610375423.0, filed on May 30, 2016, the content of which is incorporated by reference herein in its entirety.

TECHNICAL FIELD

The present disclosure relates to the field of electronic technology, and particularly to a method for controlling unlocking and a terminal.

BACKGROUND

At present, fingerprint recognition technology has become a standard configuration of mainstream terminals (such as smart phones, tablet PCs and other terminal equipment). Fingerprint recognition can be used for unlocking, waking, and other functions of the terminal; besides, fingerprint recognition is an important part of mobile payments. Fingerprint payment also puts forward higher requirements for security while providing users with convenience. Fingerprint recognition process can include characteristic extraction, data saving, and image matching. First, an original fingerprint image is acquired via a fingerprint recognition sensor, thereafter, the original fingerprint image undergoes preliminary processing so that it can be clearer, and then, the original fingerprint image matches a registered fingerprint template for minutiae. The terminal will be unlocked when matches.

"Unlocking time" refers to a time period from the fingerprint image is acquired by the terminal until system unlocking. The length of the unlocking time has become a competition point of products of terminal manufacturers, and how to shorten the unlocking time of the terminal has become a technical problem to be solved in the field.

BRIEF DESCRIPTION OF THE DRAWINGS

In order to illustrate technical solutions of implementations of the present disclosure more clearly, the drawings used in the description of the implementations will be briefly described, it will be apparent that the drawings described in the following are implementations of the present disclosure, and it will be apparent to those skilled in the art that other drawings can be obtained from the drawings without any creative work.

DETAILED DESCRIPTION

In order to provide a better understanding of the present disclosure for those skilled in the art, technical schemes of the implementations of the present disclosure will be described in the following description in conjunction with the accompanying drawings clearly and completely. Obviously, the described implementations are merely a part rather than all of the implementations of the present disclosure. All other implementations obtained by those of ordinary skill in the art based on the implementations of the present disclosure without creative labor should fall within the scope of the present disclosure.

The following will be described in detail.

The terms "first", "second", "third", and "fourth" used in the specification, the claims, and the accompany drawings of the present disclosure are used for distinguishing between different objects rather than describing a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "implementation" or "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

In the following, some of the terms used herein are explained to facilitate the understanding for those skilled in the art.

Terminal

Terminal, also known as terminal device, terminal equipment or user equipment (UE), means a device that provides voice and/or data connectivity to a user, examples of which includes hand-held devices with wireless connectivity function, on-board devices and the like. Common terminals include, for example, mobile phones, tablets, laptops, hand-held computers, mobile internet devices (MID), and wearable equipment such as smart watches, smart bracelets, and pedometers and so on.

Fingerprint Recognition Sensor

A fingerprint recognition sensor, also known as a fingerprint recognition sensor or fingerprint sensor, can realize the recognition of individual fingerprint features through a specific induction sensor. At present, the fingerprint recognition sensor is mainly divided into an optical fingerprint sensor, a capacitive fingerprint sensor, and a radio frequency (RF)

fingerprint sensor. The fingerprint recognition sensor can be set in combination with a metal dome array (in other words, dome key) of a terminal, and can be set on the front surface, the race surface, or the side surface of the terminal, the present disclosure is not limited thereto. Similarly, the fingerprint recognition sensor can be set in combination with the touch screen of the terminal. For example, the fingerprint recognition sensor can be set below the touch panel of the touch screen.

Capacity Auto Control (CAC) Parameter

A CAC parameter includes "ADC shift or ADC offset", "ADC gain", and "pixel gain". "ADC shift" refers to the offset of an analog-to-digital converter (ADC).

Assume that the fingerprint recognition sensor includes 56*172 pixels, each pixel in a drawing process corresponds to a pixel value; that is, a total of 10,752 pixel values can be obtained, usually the size of these 10,752 pixel values is between 0.4 and 0.8 and the pixel values for most pixels are different, and then a distribution map can be formed. "ADC gain" refers to the gain of the ADC; the greater the gain, the more dispersed the distribution map, on the other hand, the smaller the gain, the more concentrated the distribution map; the more dispersed the distribution map, the higher the contrast of an image received, and originally darker pixels in the fingerprint image will be even darker while originally whiter pixels in the fingerprint image will be even whiter. "Pixel gain" refers to the gain of a pixel and is determined by a capacitor connected in parallel with an amplifier. The amplifier is connected in parallel with multiple capacitors and each of the capacitors can be controlled by a switch. The more the switch is closed, the greater the gain, the larger the pixel value, and the stronger the signal strength.

During a control process of the ADC, generally, the "pixel gain" is fixed, and therefore, the control process of the ADC is mainly used to adjust the "ADC shift" and the "ADC gain", among which the "ADC shift" is for adjusting the location of the whole distribution map, and the "ADC gain" is for adjusting the distribution or dispersion of the distribution map. Each finger is not the same, and the fingerprint recognition sensor can be used to debug captured images via different parameters. Assuming the "ADC shift" and the "ADC gain" each have five levels, the combination of these two can have 25 combinations, so the fingerprint recognition sensor can receive up to 25 fingerprint images each time.

Feature

Feature or characteristic refers to fingerprint features of a fingerprint image or a fingerprint recognition sensor; the fingerprint feature includes overall features and local features. The overall features in turn include basic pattern patterns such as loop, arch, and whorl. The local features, also known as minutiae, node, or feature point, generally refer to an individual portion of the fingerprint or information representative thereof. Two fingerprints often have the same overall features, however, their local features, that is, the minutiae, cannot be exactly the same. Prints of a fingerprint are not continuous, smooth, or straight, but often break, bifurcated, or curved. These break points, bifurcation points, and turning points are called "minutiae", which can provide confirmation information of the uniqueness of a fingerprint. Minutiae on a fingerprint have the following four different properties. 1) ending, means an end of a print; 2) Bifurcation, means the splitting of a print into two or more than two prints; 3) ridge divergence, means the separating of two parallel prints; 4) dot or island, means a particularly short print that become a little dot; 5) enclosure, means a small ring formed when a print separated into two prints and these two prints immediately merged into one. Fingerprint feature data still includes the follows: 1) short Ridge, means a print which is short but not so short to be a little dot; 2) orientation, means that a minutiae point can toward a certain direction; 3) curvature, describes the speed at which the orientation of a print changes; 4) position, which is described via (x, y) coordinates, can be absolute, or can be inductively recognized relative to triangular points or minutiae.

Wet Finger

Wet finger, also known as sweaty finer, that is, in the absence of exercise, some people's hands will sweat, commonly known as easy sweat body. In this case, the surface of the finger will have a lot of sweat, such finger will be called wet finger.

Fingerprint Template

Figure 8:
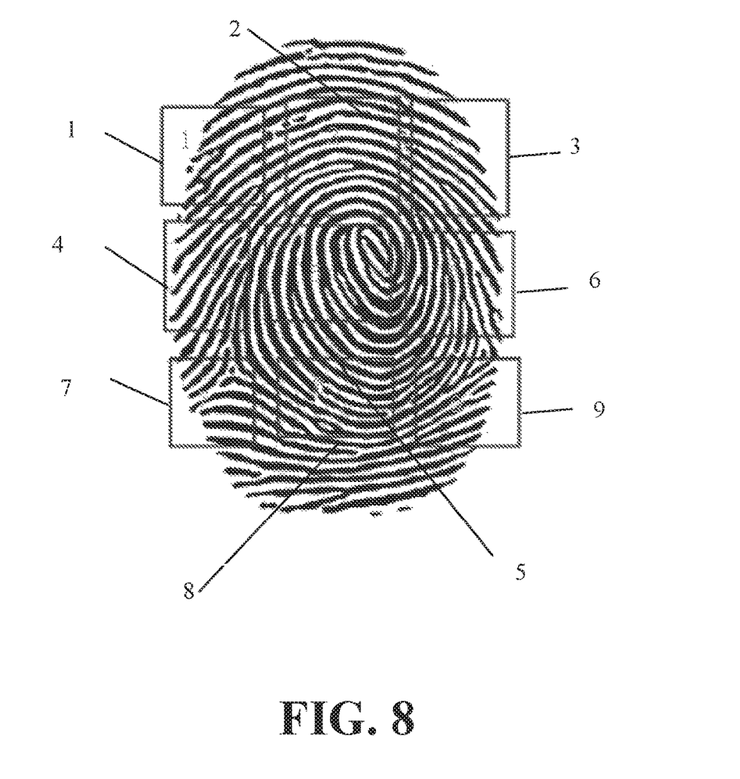
FIG. 8 is a schematic diagram illustrating a fingerprint template according to an implementation of the present disclosure.

The term "fingerprint template" and variants thereof, generally refers to a substantially complete fingerprint, or information representative thereof, collected from one or more nodes of a finger. For example, when a fingerprint function of a terminal such as a mobile phone is enabled for the first time, the user may be asked to undergo a fingerprint registration process; during the fingerprint registration, the user put his or her finger on a fingerprint sensor for fingerprint image acquisition or receiving by the fingerprint sensor, and the fingerprint image received will be stored as a fingerprint template, usually, one finger corresponds to one fingerprint template; generally, the fingerprint sensor may receive 10-20 times for each finger in order to receive the whole fingerprint face and generate a comprehensive fingerprint template. Feature information can be obtained from the fingerprint image received, and for example, the fingerprint template can be saved in the form of image. FIG. 8 illustrates an exemplary fingerprint template, and the numbers marked in the fingerprint of FIG. 8 refers to feature points.

False Rejection Rate (FRR)

FRR refers to the percentage of recognition instances in which false rejection occurs, namely, refers to the probability of error that the same fingerprint is identified as a different fingerprint and rejected. FRR=(the number of fingerprints false rejected/the total number of fingerprints examined)*100%.

False Accept Rate (FAR)

FAR refers to the percentage of recognition instances in which false acceptance occurs, namely, refers to the probability of error that different fingerprints are identified as the same one or identified as match. FAR=(the number of fingerprints false accepted/the total number of fingerprints examined)*100%.

Fingerprint Image

Fingerprint image generally refers to images collected or received by the fingerprint recognition sensor; fingerprint image data, fingerprint image information, fingerprint data, or fingerprint information generally refers to information or data of the fingerprint image, and can be stored locally in the terminal such as stored in a database or memory built into the terminal. When we refer to acquiring or receiving fingerprint image, this can be understood as receiving fingerprint image information or fingerprint image data, or data required to generate a fingerprint image.

In addition, the terms "a plurality of" or "multiple" means two or more than two. The term "and/or" is used to describe the association of associated objects and indicates that there can be three relationships. For example, "A and/or B" means three situations, that is, A alone, both A and B, or B alone.

The character "/" generally indicates that the associated objects before and after the character are in an "OR" relationship.

In the following, when we refer to "receive" or "receiving" fingerprint image or fingerprint data, it means that the terminal or the fingerprint recognition sensor of the terminal or other related components of the terminal can acquire, collect, obtain or in other manners to get the fingerprint image or fingerprint data. The present disclosure is not limited thereto.

Implementations of the present disclosure will be described below in detail.

According to an implementation of the present disclosure, there is provided a method for controlling unlocking, in which first fingerprint images and second fingerprint images are collected, a specific fingerprint image is selected from the above mentioned fingerprint images so as to conduct fingerprint comparison, and the terminal will be unlocked on the basis of the result of the fingerprint comparison.

Figure 1:
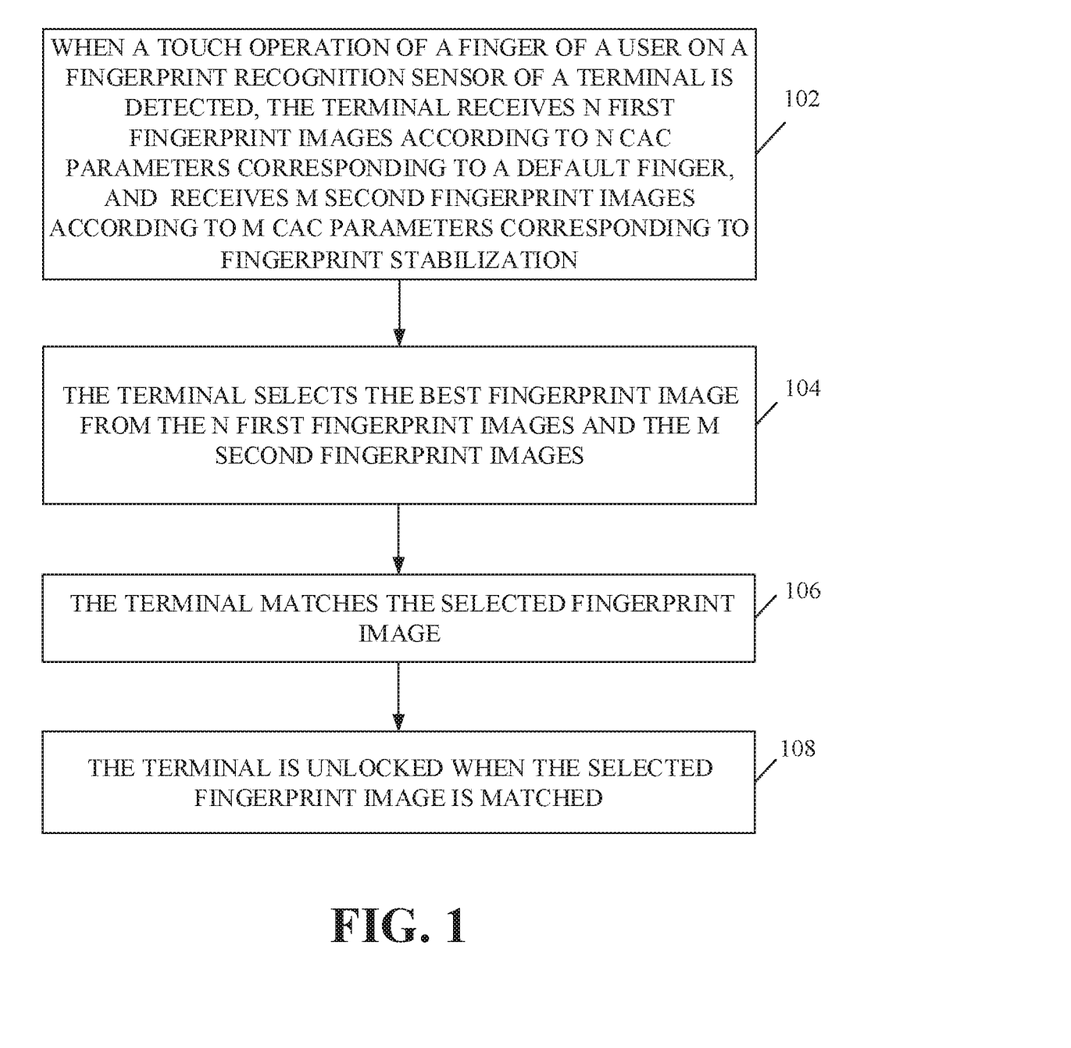
FIG. 1 is a flow schematic diagram illustrating a method for controlling unlocking according to an implementation of the present disclosure.

FIG. 1 is a flow schematic diagram illustrating a method for controlling unlocking according to an implementation of the present disclosure. Referring to FIG. 1, the method is applicable to a terminal and can begin at block 102.

At block 102, when a touch operation of a finger of a user on a fingerprint recognition sensor of a terminal is detected, the terminal receives N first fingerprint images according to N CAC parameters corresponding to a default finger, and receives M second fingerprint images according to M CAC parameters corresponding to fingerprint stabilization, where N is a positive integer, and M is an integer greater than 1. As an implementation, the default finger is a wet finger of the user.

At block 104, the terminal selects the best fingerprint image from the N first fingerprint images and the M second fingerprint images. The best fingerprint image may be a fingerprint image having the best clarity, or a fingerprint image having the most feature points to be used for matching or comparison. The present disclosure is not limited thereto.

At block 106, the terminal matches the selected fingerprint image, that is, the best fingerprint image. For example, the terminal may perform a fingerprint comparison on the selected fingerprint image. The fingerprint comparison can be performed between a pre-stored fingerprint image template and the selected fingerprint image. The fingerprint comparison can be comprehended as comparison between feature points of fingerprint images.

At block 108, the terminal is unlocked when the selected fingerprint image is matched, in other words, when the result of the fingerprint comparison is matched.

As can be seen, by means of the method for controlling unlocking, when it is detected that a user is pressing a fingerprint recognition sensor, fingerprint images configured to unlock the terminal will be received or acquired directly without receiving or acquiring an image configured to conduct fingerprint stabilization judgment separately. Since the second fingerprint image is acquired by the fingerprint recognition sensor based on CAC parameters corresponding to fingerprint stabilization, therefore time required for terminal unlocking can be shortened while fingerprint stabilization judgment is also achieved implicitly. In addition, the N first fingerprint images are received according to the N CAC parameters corresponding to the default finger, which can guarantee that the fingerprint recognition sensor still has one first fingerprint image available in case that none of the M second fingerprint images obtained is clear because the finger of the user is wet, and the fingerprint recognition FRR can be reduced.

As an implementation, the method can further include the follows before the terminal receives the M second fingerprint images according to M CAC parameters corresponding to fingerprint stabilization at block 102. The terminal determines a basic CAC parameter and a default rule corresponding to fingerprint stabilization, and determines the M CAC parameters according to the basic CAC parameter and the default rule.

For example, when the finger of the user is pressing the fingerprint recognition sensor, hand shake or finger shake (that is, instability) may occur although not frequently. Since fingerprint stabilization judgment is not carried out explicitly during the fingerprint image receiving process, in order to prevent the fingerprint recognition sensor from obtaining a vague fingerprint image due to the instability of the finger of the user and therefore prevent the fingerprint recognition FRR from increasing, the terminal can collect fingerprint images with regard to CAC parameters corresponding to fingerprint stabilization. For instance, the terminal may pre-determine a basic CAC parameter corresponding to fingerprint stabilization, and then determine M CAC parameters corresponding to fingerprint stabilization on the basis of the basic CAC parameter and a default rule, so as to obtain M second fingerprint images through the M CAC parameters. M second fingerprint images include the basic CAC parameter and the M−1 fingerprint images.

For example, the basic CAC parameter may be pre-determined, or may be determined by the terminal according to the usage of the user, the present disclosure is not limited thereto. The default rule corresponds to M−1 differential items. Each differential item corresponds to one CAC parameter, and the M−1 differential items correspond to M−1 CAC parameters. For instance, among the above mentioned M CAC parameters, there is a relationship between the M−1 CAC parameters and the basic CAC parameter as follows:

$$\text{the first } CAC \text{ parameter} = \text{the basic } CAC \text{ parameter} + \text{the first differential item};$$
$$\text{the second } CAC \text{ parameter} = \text{the basic } CAC \text{ parameter} + \text{the second differential item};$$
$$\ldots$$
$$M\text{-}1^{th} \ CAC \text{ parameter} = \text{the basic } CAC \text{ parameter} + M\text{-}1^{th} \text{differential item.}$$

Since the M−1 CAC parameters are determined based on the basic CAC parameter corresponding to fingerprint stabilization, the M CAC parameters determined will be more in line with the current fingerprint collection environment, and the clarity of the fingerprint image configured to unlock the terminal can be further improved.

As an implementation, at the beginning of the method, the terminal may determine whether an image received is a fingerprint image. Based on this, the method illustrated in FIG. 1 can further include the follows before the N first fingerprint images are collected.

The terminal receives one image and determines whether the received image is a fingerprint image, and when the image is a fingerprint image, the terminal receives N first fingerprint images according to N CAC parameters corresponding to the default finger.

For instance, the terminal can determine whether the received image is a fingerprint image based on the area of the image and underlying data for generating the image.

In at least one implementation, the manner in which the terminal determines whether the received image is a fingerprint image can be as follows. The terminal determines the area of the collected image via a MCU of the fingerprint recognition sensor; the terminal determines that the collected image is not a fingerprint image when the area of the collected image is less than a first threshold.

For example, in daily life, the user may accidentally or mistakenly touch the fingerprint identification sensor. In this situation, the fingerprint recognition sensor will acquires said one image, and then the terminal will start a processor to perform a fingerprint unlocking operation, which will increase the power consumption of the terminal. In order to avoid the above-mentioned problem, before the terminal starts the processor to execute the fingerprint unlocking operation, the terminal first determines, via the MCU of the fingerprint recognition sensor for example, whether the image acquired by the fingerprint recognition sensor is a fingerprint image, specific implementation thereof includes the follows.

If the area of the image is small (such as less than the first threshold), the terminal determines that the number of feature points that can be extracted is small and the image cannot be used for identity judgment. In this situation, regardless of whether it is the finger of the user or another object that touches the fingerprint recognition sensor, the terminal will not start the processor to conduct the fingerprint unlocking operation; therefore power consumption of the terminal can be reduced. The first threshold can be 1 mm*1 mm, 1.5 mm*1.5 mm, 2 mm*2 mm, or other appropriate values.

On the other hand, if the area of the collected image is greater than or equal to the first threshold, the terminal acquires R underlying data for generating the image, where R is an integer greater than 1. In the R underlying data, if the number of underlying data in a default range is greater than or equal to a second threshold, the terminal determines that the image is a fingerprint image. Otherwise, in the R underlying data, if the number of underlying data in a default range is less than the second threshold, the terminal determines that the image is not a fingerprint image. Sometimes, dust or water droplets on a finger are likely to affect the number of underlying data in the default range. However, generally, when the number of underlying data in the default range satisfies a certain condition, the terminal determines that a fingerprint image can be generated, that is, the image acquired in this situation is a fingerprint image.

Sometimes, although the image area is greater than the above-mentioned first threshold, it may not be a fingerprint image. For instance, the user may press the fingerprint recognition sensor with a glove, and then the image obtained is not a fingerprint image. The fingerprint image is generated based on a plurality of underlying data acquired by a plurality of sensing electrodes of a sensing electrode array of the fingerprint recognition sensor. Fingerprints are composed of finger ridge and finger valley, and underlying data corresponding to the finger ridge is in a first range, and underlying data corresponding to the finger valley is in a second range. Thus, the underlying data of the generated fingerprint image needs to fall into the first range or the second range (that is, the above-mentioned default range). Therefore, when the area of the image is greater the first threshold, the terminal may further acquires underlying data to further analyze whether the image is a fingerprint image, so as to improve accuracy of unlocking. However, in order to shorten the unlocking time, as one implementation, the terminal can determine that the image with an area greater than the first threshold is a fingerprint image directly without further acquiring the underlying data. The present disclosure is not limited thereto.

In at least one implementation, unlocking of the terminal can be implemented in different manners. For example, if there is an application bound with the selected fingerprint image, at block 108, the interface that is running when the application was last closed will be loaded and displayed. Otherwise, if there is no application bound with the selected fingerprint image, at block 108, a system desktop of the terminal will be loaded and displayed.

For example, in order to enable the user to directly enter the application interface that the he or she wants to open after unlocking the screen of the terminal, the terminal can determine whether there is an application bound with the selected fingerprint image such as the fingerprint image having the best clarity. When there is an application bound with the selected fingerprint image, the terminal can directly load and display an interface that is running when the application was last closed; when there is no application bound with the selected fingerprint image, the terminal will load and display the system desktop of the terminal, so as to further improve user experience. The operation of determining whether there is an application bound with the fingerprint image having the best clarity can be processed in parallel with the fingerprint comparison so as to further save the unlocking time of the terminal and further improve user experience of the terminal.

In at least one implementation, the process that terminal matches the selected fingerprint image can be implemented as follows. The terminal performs an image enhancing process on the selected fingerprint image so as to generate a target fingerprint image. The terminal performs a feature point matching on the target fingerprint image and a pre-stored fingerprint template, that is, the terminal compares the target fingerprint image and the pre-stored fingerprint template in terms of feature points. For example, when the ratio of matched feature points is greater than or equal to a third threshold, the target fingerprint image and the pre-stored fingerprint template are matched. Otherwise, when the ratio of matched feature points is less than the third threshold, the target fingerprint image and the pre-stored fingerprint template are not matched.

For instance, in order to reduce FRR or improve FAR, before fingerprint comparison, the terminal will needs to conduct a fingerprint enhancing process on an original fingerprint image (that is, the selected fingerprint image) to get a target fingerprint image. The target fingerprint image and a pre-stored fingerprint template subject to feature points matching, when the percentage of matched feature points is greater than or equal to a third threshold, the terminal determines that the target fingerprint image and the pre-stored fingerprint template are matched, that is, fingerprint matching is successful. Otherwise, when the percentage of matched feature points is less than the third threshold, the terminal determines that the target fingerprint image and the pre-stored fingerprint template are not matched, that is, fingerprint matching is failed.

Fingerprint matching time takes ⅓ of off-screen unlocking time. In multiple application scenarios where fast unlocking is required, in order to further shorten the off-screen unlocking time, according to a FRR-threshold graph, FRR can be reduced from 1% to 0.1% by reducing a default matching threshold (such as reducing from 80% to 70% or other appropriate values), based on this, time required for fingerprint matching will be reduced by 30 ms, and user experience will be improved.

Figure 2:
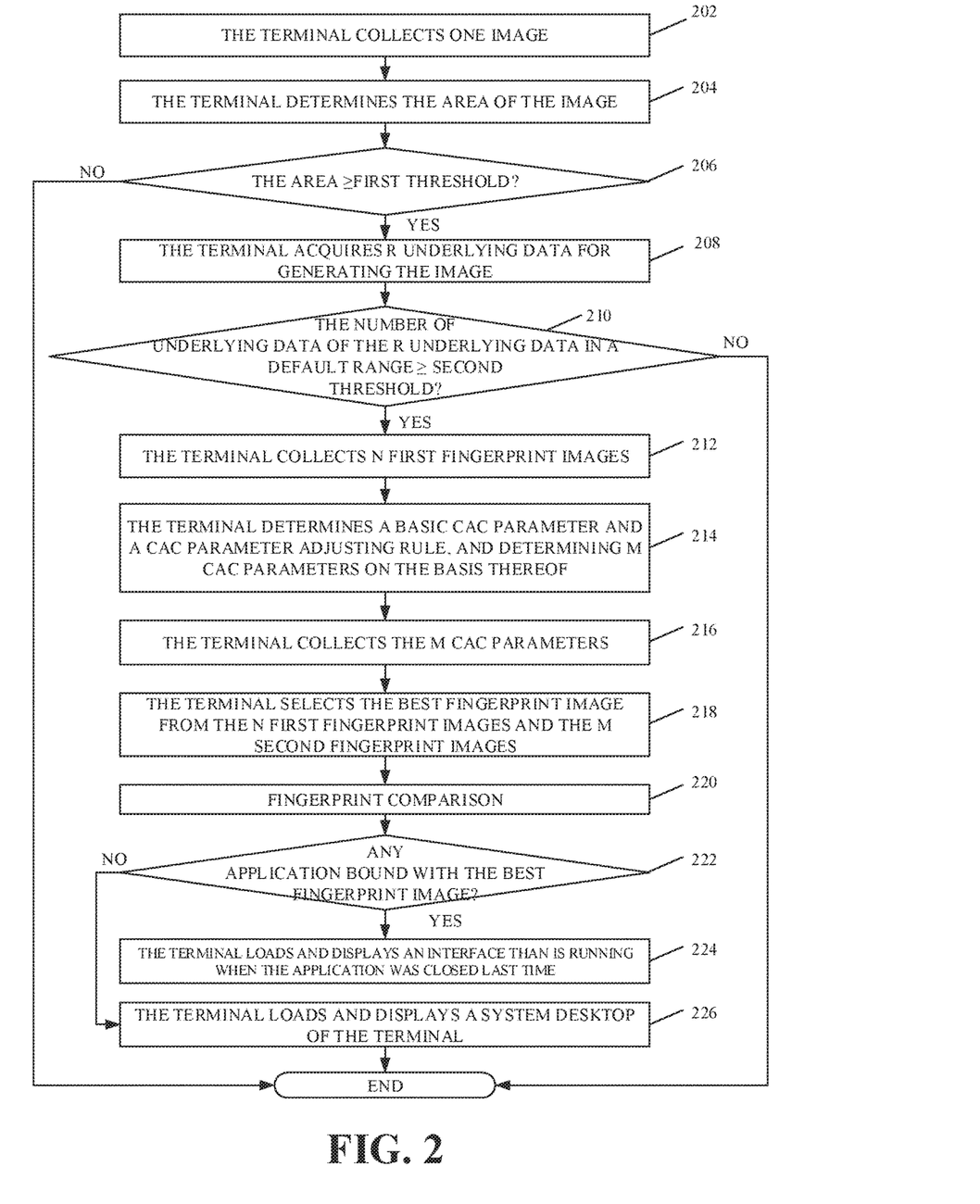
FIG. 2 is a flow schematic diagram illustrating another method for controlling unlocking according to an implementation of the present disclosure.

FIG. 2 illustrates a more detailed schematic flow chart of the method for controlling unlocking according to an implementation of the present disclosure. As illustrated in FIG. 2, the method can begin at block 202.

At block 202, when a touch operation on a fingerprint recognition sensor is detected, the terminal collects an image.

At block 204, the terminal determines the area of the image via a MCU of the fingerprint recognition sensor.

At block 206, the terminal determines whether the collected image is a fingerprint image according to the area thereof. In at least one implementation, the terminal can compare the area of the image with a first threshold. When the area of the image is less than a first threshold, the terminal determines that the collected image is not a fingerprint image, the process ends. Otherwise, the terminal proceeds to block 208.

At block 208, the terminal acquires R underlying data for generating the image collected at block 202, where R is an integer greater than 1.

At block 210, the terminal further determines whether the collected image is a fingerprint image according to the number (marked as n, and n is a positive integer) of underlying data in a default range among the R underlying data. In at least one implementation, the terminal can compare n with a preset second threshold. When n is greater than or equal to the second threshold, the terminal determines that the collected image is a fingerprint image and proceeds to block 212.

At block 212, the terminal collects N first fingerprint images according to N CAC parameters corresponding to a wet finger.

At block 214, the terminal determines a basic CAC parameter(s) and a default calculation rule corresponding to fingerprint stabilization, and further determines M CAC parameters corresponding to fingerprint stabilization based on the basic CAC parameter and the default calculation rule.

At block 216, the terminal collects M second fingerprint images based on the M CAC parameters corresponding to fingerprint stabilization.

At block 218, the terminal selects the best fingerprint image from the N first fingerprint images and the M second fingerprint images. For instance, the best fingerprint image can be a fingerprint image having the best clarity.

At block 220, the terminal performs fingerprint comparison on the best fingerprint image selected at block 218. When the best fingerprint image is matched, proceed to block 222, or the terminal can be unlocked directly.

At block 222, the terminal determines whether there is an application bound with the best fingerprint image. If yes, proceed to block 224, otherwise, proceed to block 226.

At block 224, the terminal loads and displays an interface that is running when the application was closed last time.

At block 226, the terminal loads and displays a system desktop of the terminal.

It should be noted that, during implementation, operations at block 220 and block 222 can be conducted in parallel. From this perspective, when the fingerprint comparison is successful (that is, when the best fingerprint image is matched) and there is an application bound with the best fingerprint image, proceed to block 224; when the fingerprint comparison is successful (that is, when the best fingerprint image is matched) but there is no application bound with the best fingerprint image, proceed to block 226. Operations illustrated with reference to FIG. 2 can be understood and implemented in conjunction with the description of the forgoing method for controlling unlocking, and will not be repeated here.

In the method of controlling unlocking described with reference to FIG. 1 and FIG. 2, one fingerprint image, which is used for matching, is selected from the N first fingerprint images and the M second fingerprint images. The present disclosure is not limited thereto. In order to further reduce the unlocking time of the terminal, according to another implementation of the present disclosure, a method for controlling unlocking is provided. One difference between this method and the forgoing method illustrated with reference to FIG. 1 and FIG. 2 is that, fingerprint matching can be divided into two sub-matching process as follows.

Figure 3:
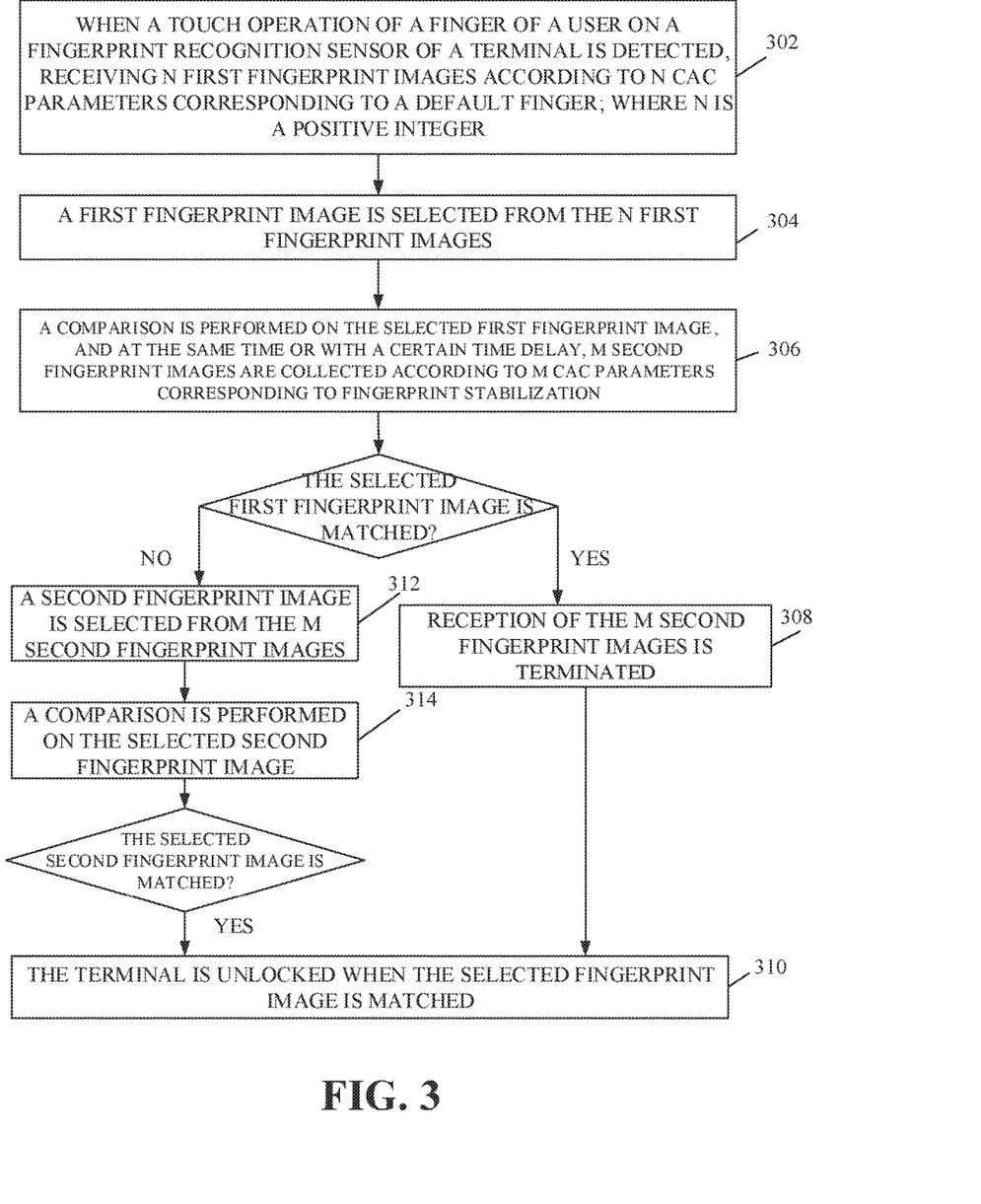
FIG. 3 is a flow schematic diagram illustrating another method for controlling unlocking according to an implementation of the present disclosure.

As illustrated in FIG. 3, the method can begin at block 302.

At block 302, when a touch operation of a finger of a user on a fingerprint recognition sensor of a terminal is detected, receiving N first fingerprint images according to N CAC parameters corresponding to a default finger; where N is a positive integer.

At block 304, a first fingerprint image is selected from the N first fingerprint images, it can be fingerprint image having the best clarity or having the most feature points for matching;

At block 306, a comparison is performed on the selected first fingerprint image, and at the same time or with a certain time delay, M second fingerprint images are collected according to M CAC parameters corresponding to fingerprint stabilization, where M is a positive integer. It should be noted that, the reception of the M second fingerprint images can be performed in parallel with the operation at block 304 either; alternatively, the operations at block 304 and block 306 can be performed in parallel. The present disclosure is not limited thereto.

At block 308, when the selected first fingerprint image is matched, the reception of the M second fingerprint images is terminated.

At block 310, the terminal is unlocked. The operations at block 308 and block 310 can be performed in parallel.

When the first fingerprint image is not matched, at block 312, a second fingerprint image is selected from the M second fingerprint images; at block 314, a comparison process is performed on the selected second fingerprint image; the terminal is unlocked when the selected second fingerprint image is matched.

As can be seen, during reception of the M second fingerprint images, a first fingerprint image selected can be compared for example with a pre-stored fingerprint image template. Once the selected first fingerprint image is matched, reception of the second fingerprint images will be terminated. Therefore, time required to receive the first fingerprint images and the second fingerprint images can be shortened, consequently, time required for unlocking the terminal can be shortened either.

In still another possible implementation, the M second fingerprint images may be received before the N first fingerprint images, and correspondingly, the selected second fingerprint image will undergo fingerprint matching first. The present disclosure is not limited thereto.

For other details, please refer to the description of the method illustrated with FIG. 1 and FIG. 2, and will not be repeated here.

Figure 4:
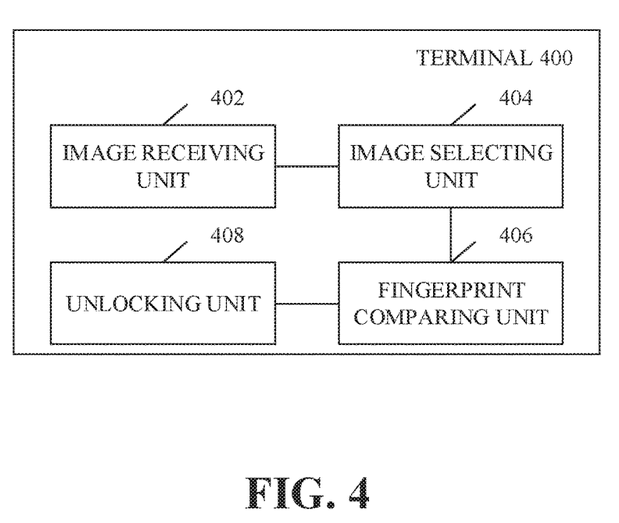
FIG. 4 is a structure schematic diagram illustrating a terminal according to an implementation of the present disclosure.

According to an implementation of the present disclosure, there is provided a terminal, FIG. 4 is a schematic structural diagram illustrating the terminal.

As illustrated in FIG. 4, a terminal 400 includes an image receiving unit 402, an image selecting unit 404, a fingerprint comparing unit 406, and an unlocking unit 408.

The image receiving unit 402 is configured to receive N first fingerprint images according to N CAC parameters corresponding to a default finger and receive M second fingerprint images according to M CAC parameters corresponding to fingerprint stabilization when a touch operation of a finger of a user on a fingerprint recognition sensor of a terminal is detected, where N is a positive integer, and M is an integer greater than 1. The default finger may a wet finger of the user for example.

The image selecting unit 404 is configured to select the best fingerprint image from the N first fingerprint images and the M second fingerprint images. For example, the best fingerprint image is a fingerprint image having the best clarity.

Figure 5:
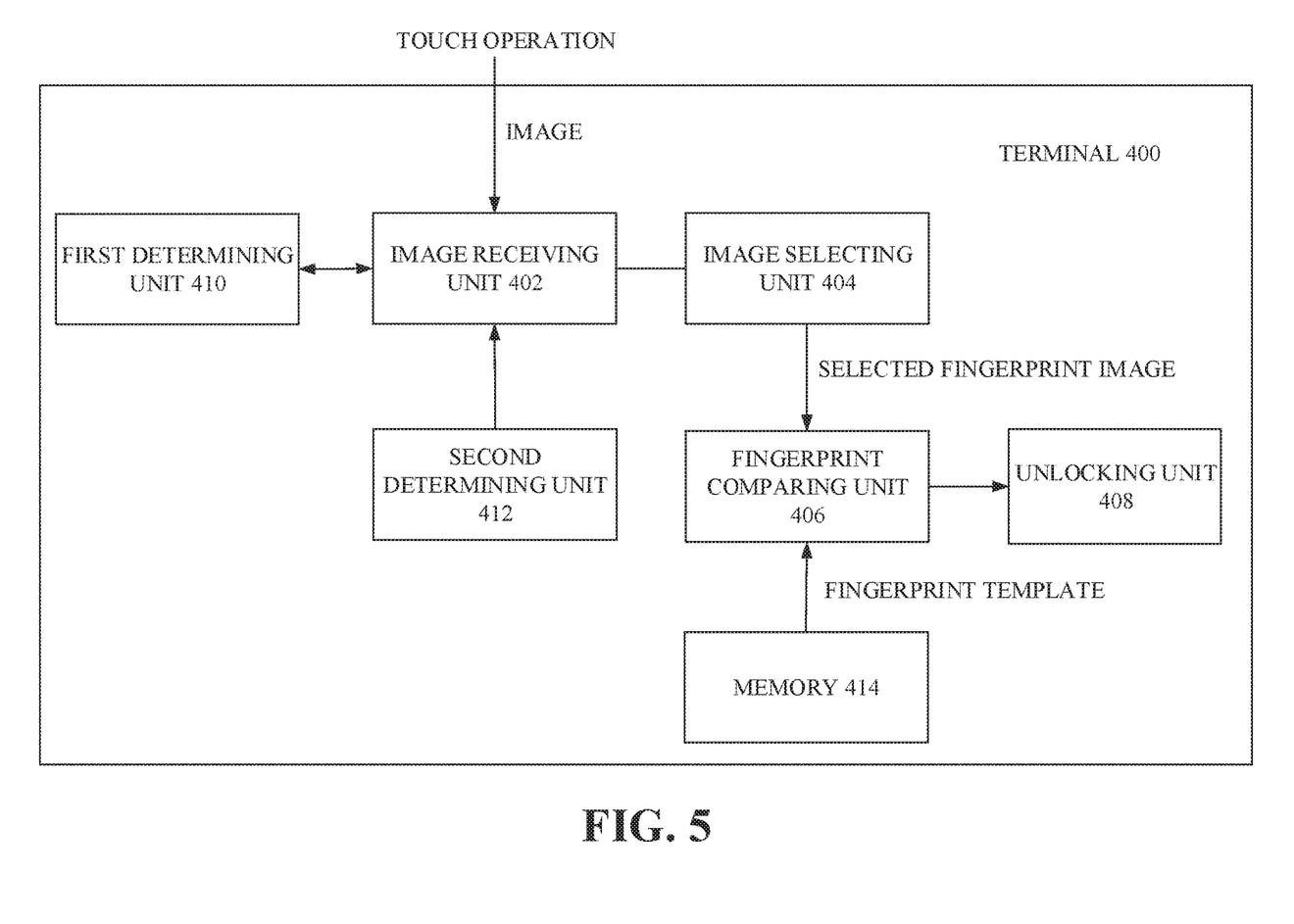
FIG. 5 is a structure schematic diagram illustrating a terminal according to an implementation of the present disclosure.

The fingerprint comparing unit 406 is configured to match the fingerprint image selected by the image selecting unit 404. For example, the fingerprint comparing unit 406 can compare the fingerprint image selected by the image selecting unit 404 with a pre-stored fingerprint template stored in a memory 414 as illustrated in FIG. 5. Alternatively, the fingerprint comparing unit 406 can first perform an image enhancing process on the fingerprint image selected by the image selecting unit 404 to obtain a target fingerprint image, and compare the target fingerprint image with the pre-stored fingerprint template. The present disclosure is not limited thereto.

The unlocking unit 408 is configured to unlock the terminal when the fingerprint image selected by the image selecting unit 404 is matched.

In at least one implementation, as illustrated in FIG. 5, the terminal 400 may further include a first determining unit 410, which is configured to determine a basic CAC parameter and a default calculation rule corresponding to fingerprint stabilization, and determine M CAC parameters corresponding to fingerprint stabilization based on the basic CAC parameter and the default calculation rule. The image receiving unit 402 can receive the M fingerprint images according to the M CAC parameters determined by the first determining unit 410.

In at least one implementation, the image receiving unit is further configured to receive one image upon detection of a press operation on the fingerprint recognition sensor before the N first fingerprint images are received. Alternatively, said one image can be one of N first fingerprint images. In this case, in the subsequent process, for the first fingerprint image, the image receiving unit 402 may receive N−1 first fingerprint images to obtain N first fingerprint images totally.

As illustrated in FIG. 5, the terminal 400 further includes a second determining unit 412, configured to determine whether the image is a fingerprint image. When the second determining unit 412 determines that said one image is not a fingerprint image, fingerprint unlocking process will be terminated directly and the image receiving unit 402 may not start to receive the N first fingerprint images. Otherwise, when the second determining unit 412 determines that said one image is a fingerprint image, other components of the terminal will act normally to carry out the fingerprint unlocking process. For example, the image receiving unit 402 may start to receive the N first fingerprint images.

As one implementation, the second determining unit 412 may determine whether the image is a fingerprint image based on the area of said one image and underlying data for generating said one image. In at least one implementation, the second determining unit 412 is configured to determine the area of the image via a MCU of the fingerprint recognition sensor; acquire R underlying data configured to generate the image when the area of the image is greater than or equal to a first threshold, wherein R is an integer greater than 1; and determine that the image is a fingerprint image when the number of underlying data among the R underlying data in a default range is greater than or equal to a second threshold. Alternatively, the second determining unit 412 may determine that said one image is a fingerprint image when the area thereof is greater than or equal to a first threshold directly. The present disclosure is not limited thereto.

The first determining unit 410 and the second determining unit 414 can be integrated into one component according to actual needs.

The unlocking unit 408 may unlock the terminal in various manners. For instance, the unlocking unit 408 may load and display an interface that is running when the application was last closed, when there is an application bounded with the fingerprint image selected by the image selecting unit 404, or the unlocking unit 408 may load and display a system desktop of the terminal, when there is no application bounded with the selected fingerprint image.

What need to be explained is, the units described above, that is, the image receiving unit 402, the image selecting unit 404, the fingerprint comparing unit 406, the unlocking unit 408, and the first determining unit 410 and the second determining unit 412 are configured to perform the relevant operations illustrated in FIG. 1 and FIG. 2.

In this implementation, the terminal 400 is presented in the form of units or modules. "Units/Modules" used herein may refer to any one of an application-specific integrated circuit (ASIC), processors for performing one or more software or hardware programs, a memory, a integrated logic circuit, or other components with the above functions.

Figure 6:
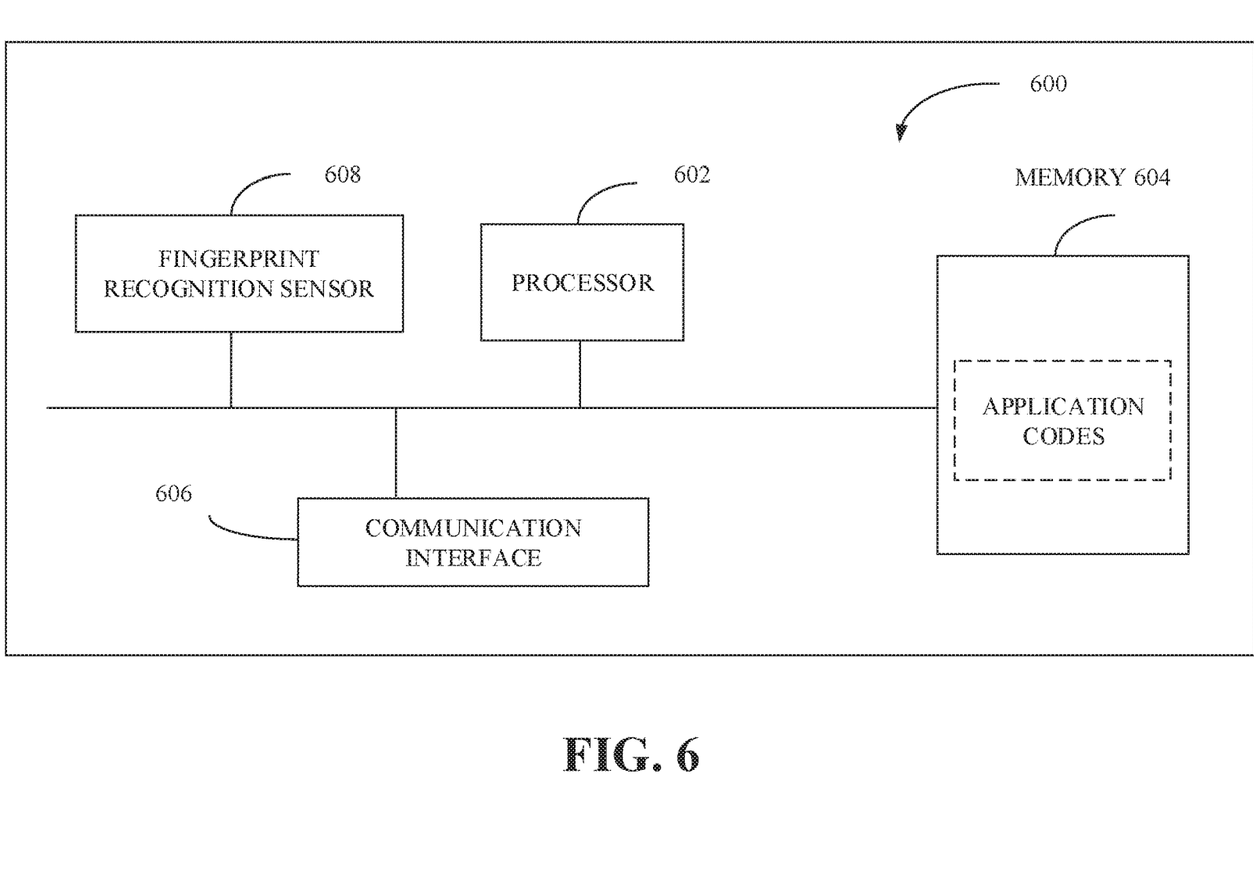
FIG. 6 is a structure schematic diagram illustrating another terminal according to an implementation of the present disclosure.

As illustrated in FIG. 6, a terminal 600 may be implemented in the structure of FIG. 6, and the terminal 600 may include at least one processor 602, at least one memory 604, at least one communication interface 606, and a fingerprint recognition sensor 608. The processor 602, the memory 604, the fingerprint recognition sensor 608, and the communication interface 606 can connect and communicate with each other via a communication bus. Furthermore, the image receiving unit 402, the image selecting unit 404, the fingerprint comparing unit 406, the unlocking unit 408, and the first determining unit 410 and the second determining unit 412 can be implemented via the processor 602 of the terminal illustrated in FIG. 6.

The processor 602 may be one of a central processing unit (CPU), a micro-processor, an ASIC, or one or more integrated circuits for controlling the programs for the implementation of above-mentioned technical solutions.

The communication interface 606 is configured to communicate with other devices or communication networks such as Ethernet, radio access network (RAN), wireless local area network (WLAN) and the like.

The memory 604 may be a read-only memory (ROM) or other types of static storage devices that can store static information and instructions, random access memory (RAM) or other types of dynamic storage devices that can store information and instructions, or may be electrically erasable programmable read-only memory (EEPROM), compact disc read-only memory (CD-ROM) or other disc storage media, disc storage media (including compact discs, laser discs, compact discs, digital versatile discs, Blu-ray discs and the like), disk storage media or other magnetic storage devices, or may be any other media that can be used to carry or store program codes in the form of instructions or data structures and that can be accessed by a computer. The present disclosure is not limited thereto. The memory can exist independently and connect to the processor 602 via the communication interface 606. The memory can also be integrated with the processor 602.

The memory 604 is configured to store application codes that executes the above-mentioned technical schemes and is controlled by the processor 602. The processor 602 is configured to execute the application codes stored in the memory 604.

The programs codes stored in the memory 604 can be used to perform the method for controlling unlocking of a terminal as illustrated in FIG. 1 or FIG. 2. For example, when a touch operation of a user on a fingerprint recognition sensor of a terminal is detected, N first fingerprint images are received according to N CAC parameters corresponding to a default finger, and M second fingerprint images are received according to M CAC parameters corresponding to fingerprint stabilization, N is a positive integer, and M is an integer greater than 1. The best fingerprint image is selected from the N first fingerprint images and M second fingerprint images, and a fingerprint comparison is conducted on the best fingerprint image. The terminal is unlocked when the best fingerprint image is matched.

Figure 7:
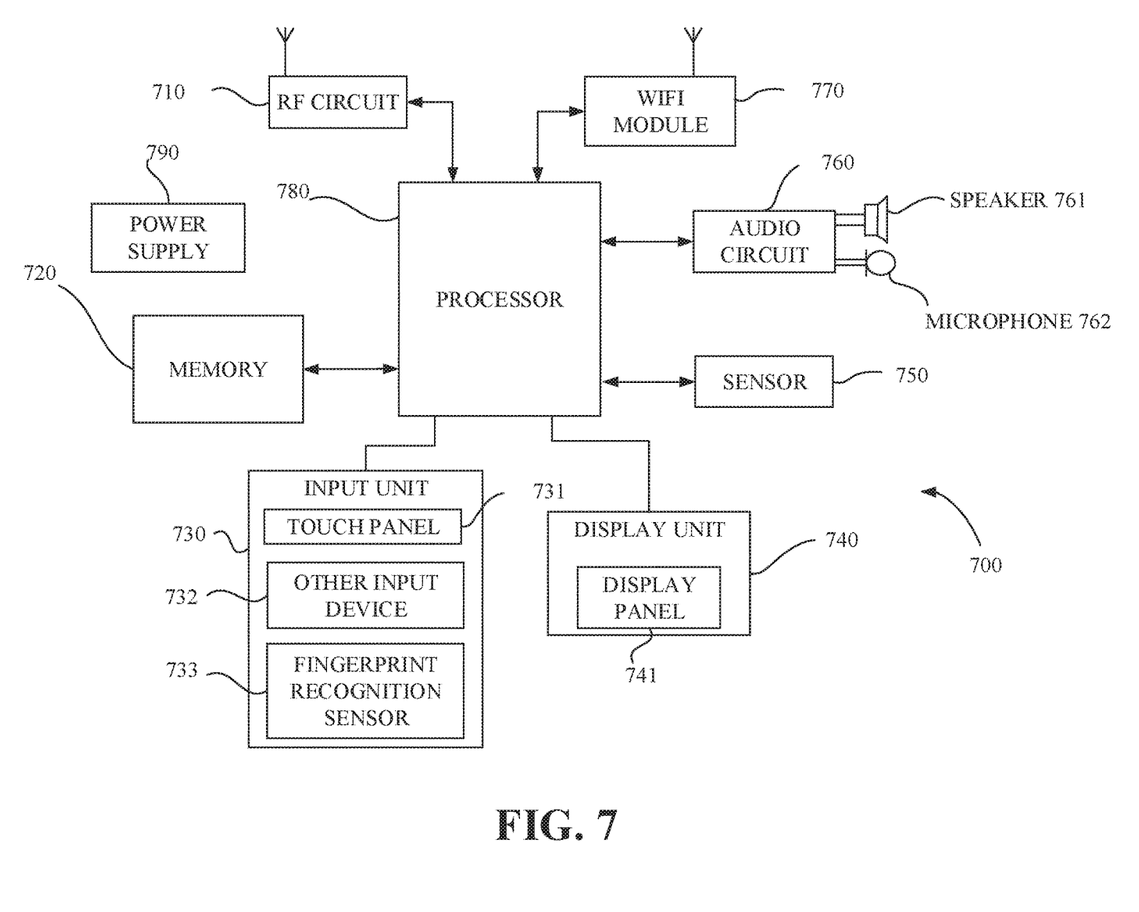
FIG. 7 is a structure schematic diagram illustrating another terminal according to an implementation of the present disclosure.

The implementation of the present disclosure further provides a more specific application scenario in which the terminal is a mobile phone and the following describes components of the mobile phone in detail with refer to FIG. 7. As illustrated in FIG. 7, a mobile phone 700 can includes a RF (radio frequency) circuit 710, a memory 720, an input unit 730, a display unit 740, a sensor 750, an audio circuit 760, a WiFi module 770, a processor 780, and a power supply 790. The input unit 730 further includes a touch panel 731, other input device 732, and a fingerprint recognition sensor 733. The display unit 740 includes a display panel 741. The audio circuit 760 is connected with a speaker 761 and a microphone 762.

The RF circuit 710 is configured for receiving and transmitting signals or transmitting or receiving information during a call, and in particular, receiving downlink information of a base station and transferring the downlink information to the processor 780 for processing, and transmitting uplink data to the base station. Generally, the RF circuit 710 includes but not limited to an antenna, at least one amplifier, a transceiver, coupler, low noise amplifier (LNA), duplexer and the like. In addition, the RF circuit 710 may also communicate with the network and other devices by wireless communication. The above wireless communication may use any communication standard or protocol, which includes but not limited to Global System of mobile communication (GSM), general packet radio service (GPRS), code division multiple access (CDMA), wideband code division multiple access (WCDMA), long term evolution (LTE), E-mail, short messaging service (SMS) and so on.

The memory 720 may be configured to store software programs and modules, and the processor 780 executes various function applications and data processing of the mobile phone by running the software programs and the modules stored in the memory 720. The memory 720 may mainly include a program storage region and a data storage region, the storage program region may store an operation system, application programs for at least one function (a fingerprint image acquisition function, a fingerprint matching function, an unlocking function) and so on; and the data storage region may store data (such as fingerprint image received by a fingerprint recognition sensor, underlying data of a fingerprint image) created according to use of the mobile phone, and so on. In addition, the memory 720 may include a high-speed RAM, and may further include a non-volatile memory such as one of at least a disk storage device, a flash device, or other non-volatile solid storage devices.

The input unit 730 may be configured to receive input digital or character information and generate key signal input associated with user setting and functional control of the mobile phone. Specifically, the input unit 730 may includes a touch panel 731, other input devices 732 and a fingerprint recognition sensor 733. The touch panel 731, also referred to as a touch screen, may receive a touch operation of the user thereon or nearby (e.g., operation on or near the touch panel 731 by a user using a finger or stylus, or any suitable object or attachment), and drive a corresponding connection device according to a pre-set program. The touch panel 731 may include a touch detection device and a touch controller. The touch detection device detects the touching position of the user and detects a signal resulted from the touch operation, and transmits the signal to the touch controller. The touch controller receives the touch information from the touch detection device and converts the information into contact coordinates and sends it to the processor 780, the touch controller can receive and execute the command sent by the processor 780. In addition, the touch panel 731 can be realized using various types such as resistive, capacitive, infrared, and surface acoustic waves. In addition to the touch panel 731, the input unit 730 may still include other input devices 732. The other input devices 732 may include, but is not limited to, at least one of a physical keyboard, a function key (such as volume control buttons, switch buttons and so on), a trackball, a mouse, and a joystick. The fingerprint recognition sensor 733 may be provided in conjunction with the dome key of the terminal or can be provided in combination with the touch panel 731. For example, the fingerprint recognition sensor 733 is provided below the touch panel 731, when a finger of the user touches the touch panel of the terminal, the fingerprint recognition sensor 733 below the touch panel 731 can receive a fingerprint image of the finger of the user.

The display unit 740 may be configured to display information input by the user or information provided for the user or various menus of the mobile phone. The display unit 740 may include a display panel 741, and alternatively, the display panel 741 may be configured in the form of a liquid crystal display (LCD), an organic light-emitting diode (OLED) and so on. Further, the touch panel 731 may covers the display panel 741. When the touch panel 731 detects a touch operation (touch event) thereon or nearby, information of the touch operation can be transmitted to the processor 780 so as to determine the type of the touch event. The processor 780 provides corresponding visual output on the display panel 741 according to the type of the touch event. Although in FIG. 7, the touch panel 731 and the display panel 741 are used as two separate components to realize the input and output functions of the mobile phone, in some implementations, the touch panel 731 may be integrated with the display panel 741 to implement the input and output functions of the mobile phone.

The mobile phone may also include at least one sensor 750, such as a light sensor, a motion sensor, and other sensors. Specifically, the light sensor may include an ambient light sensor and a proximity sensor, among which the ambient light sensor may adjust the brightness of the display panel 741 according to ambient lights, and the proximity sensor may turn off the display panel 741 and/or backlight when the mobile phone reaches nearby the ear. As a kind of motion sensor, the accelerometer sensor can detect the magnitude of acceleration in all directions (typically three axes, that is, x, y, and z); when stationary, the accelerometer sensor can detect the magnitude and direction of gravity when stationary; the accelerometer sensor can also identify the application of mobile gestures (such as vertical and horizontal screen switch, related games, magnetometer attitude calibration), or the accelerometer sensor can be used for vibration recognition of related functions (such as a pedometer, percussion) and so on. The mobile phone can also be equipped with a gyroscope, barometer, hygrometer, thermometer, infrared sensor and other sensors, and will not repeat here.

The audio circuit 760, the speaker 761, the microphone 762 may provide an audio interface between the user and the mobile terminal. The audio circuit 760 may convert the received audio data into electrical data and transfer the electrical data to the speaker 761, thereafter, the speaker 761 converts the electrical data into a sound signal for output. On the other hand, the microphone 762 converts the collected sound signal into an electrical signal which will be received by the audio circuit 760 and converted into audio data to output to the processor 780, the audio data is processed by the processor 780 and transmitted via an RF circuit 710 to, for example, another mobile phone, or, the audio data is output to the memory 720 for further processing.

WiFi belongs to a short-range wireless transmission technology, the mobile phone may assist the user in E-mail receiving and sending, webpage browsing, access to streaming media and the like by means of the WiFi module 770; WiFi provides users with wireless broadband Internet access. Although illustrated in FIG. 7, it should be understood that the WiFi module 770 is not a necessary part of the mobile phone and can be omitted according to actual needs without departing from the essential nature of the present disclosure.

The processor 780 is the control center of the mobile phone, it uses various interfaces and lines to connect various parts of the whole mobile phone, runs or executes software programs and/or modules stored in the memory 720, and calls data stored in the memory 720 to perform various functions of the mobile phone and process data, thereby monitoring the mobile phone. In at least one implementation, the processor 780 may include one or more processing units; for example, the processor 780 may integrate an application processor and a modem processor, wherein the application processor handles the operating system, the user interface, the application, and so on, and the modem processor mainly processes wireless communication. It will be appreciated that the above-mentioned modem processor may not be integrated into the processor 780.

The mobile phone also includes a power supply 790 (e.g., a battery) that supplies power to various components. For instance, the power supply 790 may be logically connected to the processor 780 via a power management system to enable management of charging, discharging, and power consumption through the power management system. Although not illustrated, the mobile phone may include a camera, a Bluetooth module, etc., and will not be elaborated here. The method of each step in the foregoing implementations can be realized based on the configuration of the terminal illustrated in FIG. 7.

The implementation of the present disclosure also provides a computer readable storage medium. The computer readable storage medium may store a program which, when executed, can accomplish all or part of the steps of the unlocking method described in the above-described method implementation.

It is to be noted that, for the sake of simplicity, the foregoing method implementations are described as a series of action combinations, however, it will be appreciated by those skilled in the art that the present disclosure is not limited by the sequence of actions described. That is because that, according to the present disclosure, certain steps may be performed in other order or simultaneously. Also, it will be appreciated by those skilled in the art that the implementations described in the specification are exemplary implementations and the actions and modules involved are not necessary for the present disclosure.

In the foregoing implementations, descriptions of each implementation are emphasized respectively, and parts which are not elaborated in a certain implementation may subject to relevant descriptions of other implementations.

The apparatus disclosed in implementations provided herein may be implemented in other ways. For example, the device/apparatus implementations described above are merely illustrative; for instance, the division of the unit is only a logical function division and there can be another way of division during actual implementations, for example, multiple units or components may be combined or may be integrated into another system, or some features may be ignored or not performed. In addition, coupling or communication connection between each displayed or discussed component may be direct coupling or communication connection, or may be indirect coupling or communication among devices or units via some interfaces, and may be electrical and mechanical or adopt other forms.

The units described as separate components may or may not be physically separate, the components shown as units may or may not be physical units, and namely they may be in the same place or may be distributed to multiple network elements. Part or all of the units may be selected per actual needs to achieve the purpose of the technical solutions of the implementations.

In addition, the functional units in various implementations of the present disclosure may be integrated in one processing unit, or each unit may be physically present, or two or more units may be integrated in one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory described above includes a variety of media that can store programs codes, such as a USB disk, a read-only memory (ROM), a random-access memory (RAM), a mobile hard disk, a magnetic disk, or an optical disk and so on.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or CD, and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for controlling unlocking, comprising:
   receiving an image when a touch operation of a finger of a user on a fingerprint recognition sensor of a terminal is detected,
   when the image is determined to be a fingerprint image, receiving N first fingerprint images according to N capacity auto control (CAC) parameters corresponding to a default finger, and receiving, by the fingerprint recognition sensor, M second fingerprint images according to M CAC parameters corresponding to fingerprint stabilization, wherein the M CAC parameters are obtained according to a basic parameter corresponding to fingerprint stabilization and M−1 differential values, wherein the N first fingerprint images are not used for fingerprint stabilization, wherein N is a positive integer, and wherein M is an integer greater than 1;
   selecting the best fingerprint image from the N first fingerprint images and the M second fingerprint images, by comparing the N first fingerprint images and the M second fingerprint images;
   matching the selected fingerprint image; and
   controlling the unlocking of the terminal, by unlocking the terminal when the selected fingerprint image is matched.

2. The method of claim 1, further comprising:
   before receiving the M second fingerprint images according to the M CAC parameters corresponding to fingerprint stabilization, determining a basic CAC parameter and a default rule corresponding to fingerprint stabilization, and determining the M CAC parameters according to the basic CAC parameter and the default rule.

3. The method of claim 1, further comprising:
   determining whether the image is the fingerprint image based on an area of the image and underlying data for generating the image.

4. The method of claim 3, wherein determining whether the image is the fingerprint image comprises:
   determining the area of the image via a micro-control module (MCU) of the fingerprint recognition sensor;
   acquiring R underlying data sets configured to generate the image when the area of the image is greater than or equal to a first threshold, wherein R is an integer greater than 1; and
   determining that the image is the fingerprint image when a number of underlying data sets among the R underlying data sets in a default range is greater than or equal to a second threshold.

5. The method of claim 1, wherein unlocking the terminal comprises one of:
   loading and displaying an interface that is running when an application was last closed when there is an application bounded with the selected fingerprint image; and
   loading and displaying a system desktop of the terminal when there is no application bounded with the selected fingerprint image.

6. The method of claim 1, wherein matching the selected fingerprint image comprises:
   performing an image enhancing process on the selected fingerprint image to obtain a target fingerprint image; and
   matching the target fingerprint image with a pre-stored fingerprint image template.

7. The method of claim 1, wherein the best fingerprint image comprises one of: a fingerprint image having the best clarity, and a fingerprint image having the most feature points.

8. A terminal, comprising a hardware processor to:
   receive an image upon detection of a touch operation of a finger of a user on a fingerprint recognition sensor of a terminal;
   when the image is determined to be a fingerprint image, receive N first fingerprint images according to N capacity auto control (CAC) parameters corresponding to a default finger and receive M second fingerprint images according to M CAC parameters corresponding to fingerprint stabilization, wherein the N first fingerprint images are not used for fingerprint stabilization, wherein N is a positive integer, wherein the M CAC parameters are obtained according to a basic parameter corresponding to fingerprint stabilization and M−1 differential values, and wherein M is an integer greater than 1;
   select the best fingerprint image from the N first fingerprint images and the M second fingerprint images, by comparing the N first fingerprint images and the M second fingerprint images;
   match the selected fingerprint image; and
   control the unlocking of the terminal, by unlocking the terminal when the selected fingerprint image is matched.

9. The terminal of claim 8, wherein the hardware processor is further configured to:
   determine a basic CAC parameter and a default rule corresponding to fingerprint stabilization, and determine the M CAC parameters according to the basic CAC parameter and the default rule.

10. The terminal of claim 8, wherein the hardware processor is further configured to determine whether the image is the fingerprint image based on an area of the image and underlying data for generating the image.

11. The terminal of claim 10, wherein the hardware processor is further configured to:
    determine the area of the image via a micro-control module (MCU) of the fingerprint recognition sensor;
    acquire R underlying data sets configured to generate the image when the area of the image is greater than or equal to a first threshold, wherein R is an integer greater than 1; and
    determine that the image is the fingerprint image when a number of underlying data sets among the R underlying data sets in a default range is greater than or equal to a second threshold.

12. The terminal of claim 8, wherein the hardware processor is further configured to:
    load and display an interface that is running when an application was last closed, when there is an application bounded with the selected fingerprint image; and
    load and display a system desktop of the terminal, when there is no application bounded with the selected fingerprint image.

13. The terminal of claim 8, wherein the best fingerprint image is one of: a fingerprint image having the best clarity, and a best fingerprint image having the most feature points.

14. A method for controlling unlocking, comprising:
receiving an image when a touch operation of a finger of a user on a fingerprint recognition sensor of a terminal is detected;
receiving N first fingerprint images according to N capacity auto control (CAC) parameters corresponding to a default finger, when the image is determined to be a fingerprint image; wherein the N first fingerprint images are not used for fingerprint stabilization, and N is a positive integer;
selecting a first fingerprint image from the N first fingerprint images, by comparing the N first fingerprint images;
matching the selected first fingerprint image and receiving in parallel with the matching, by the fingerprint recognition sensor, M second fingerprint images according to M CAC parameters corresponding to fingerprint stabilization, wherein the M CAC parameters are obtained according to a basic parameter corresponding to fingerprint stabilization and M−1 differential values, and M is a positive integer; and
terminating the reception of the M second fingerprint images, and controlling, by the terminal, unlocking thereof by unlocking the terminal when the selected first fingerprint image is matched.

15. The method of claim 14, further comprising:
when the first fingerprint image is not matched, selecting a second fingerprint image from the M second fingerprint images;
matching the selected second fingerprint image; and
unlocking the terminal when the selected second fingerprint image is matched.

16. The method of claim 14, further comprising:
determining whether the image is a fingerprint image based on at least one of an area of the image and underlying data for generating the image.

17. The method of claim 14, wherein matching the first fingerprint image comprises:
performing an image enhancing process on the selected first fingerprint image to obtain a target fingerprint image; and
matching the target fingerprint image with a pre-stored fingerprint template.

18. The method of claim 14, wherein the selected first fingerprint image is a fingerprint image having the best clarity of the N first fingerprint images; and a selected second fingerprint image is a fingerprint image having the best clarity of the M second fingerprint images.

* * * * *